United States Patent [19] [11] 4,205,936
Green [45] Jun. 3, 1980

[54] CONTROLLED ENVIRONMENT WAREHOUSING SYSTEM, APPARATUS AND PROCESS, AND METHODS OF CONSTRUCTING AND UTILIZING SAME

[76] Inventor: Daniel E. Green, 60 Crestwood Dr., St. Louis, Mo. 63105

[21] Appl. No.: 856,915

[22] Filed: Dec. 2, 1977

[51] Int. Cl.² .............................................. B65G 1/18
[52] U.S. Cl. .................................... 414/276; 414/266
[58] Field of Search ............... 214/16.4 C, 16.1 CF, 214/16 B, 41 R, 44 R; 414/266–268, 276–278, 281, 282, 285, 235, 236, 373

[56] References Cited
U.S. PATENT DOCUMENTS

| 1,210,860 | 1/1917 | Sims | 214/16.4 C |
| 3,777,911 | 12/1973 | Bornfleth | 214/16.4 C |
| 3,836,020 | 9/1974 | Lassig | 214/16.4 C |
| 3,921,828 | 11/1975 | Suizu | 214/16.4 C |

Primary Examiner—Stephen G. Kunin
Assistant Examiner—Edmond G. Rishell, Jr.
Attorney, Agent, or Firm—Cullen, Sloman, Cantor, Grauer, Scott & Rutherford

[57] ABSTRACT

A first-in first-out controlled environment warehousing system including a series of sloped modules having a controlled environment therein through which products to be stored traverse. The products line up at the lower end of each module for ready removal therefrom on a first-in first-out basis, and only the product enters the controlled environment. Fork lifts and other loading or unloading devices remain out of the controlled environment. Earth, in addition to a passage for empty product containers, serves as insulation for the product passage in each module.

15 Claims, 3 Drawing Figures

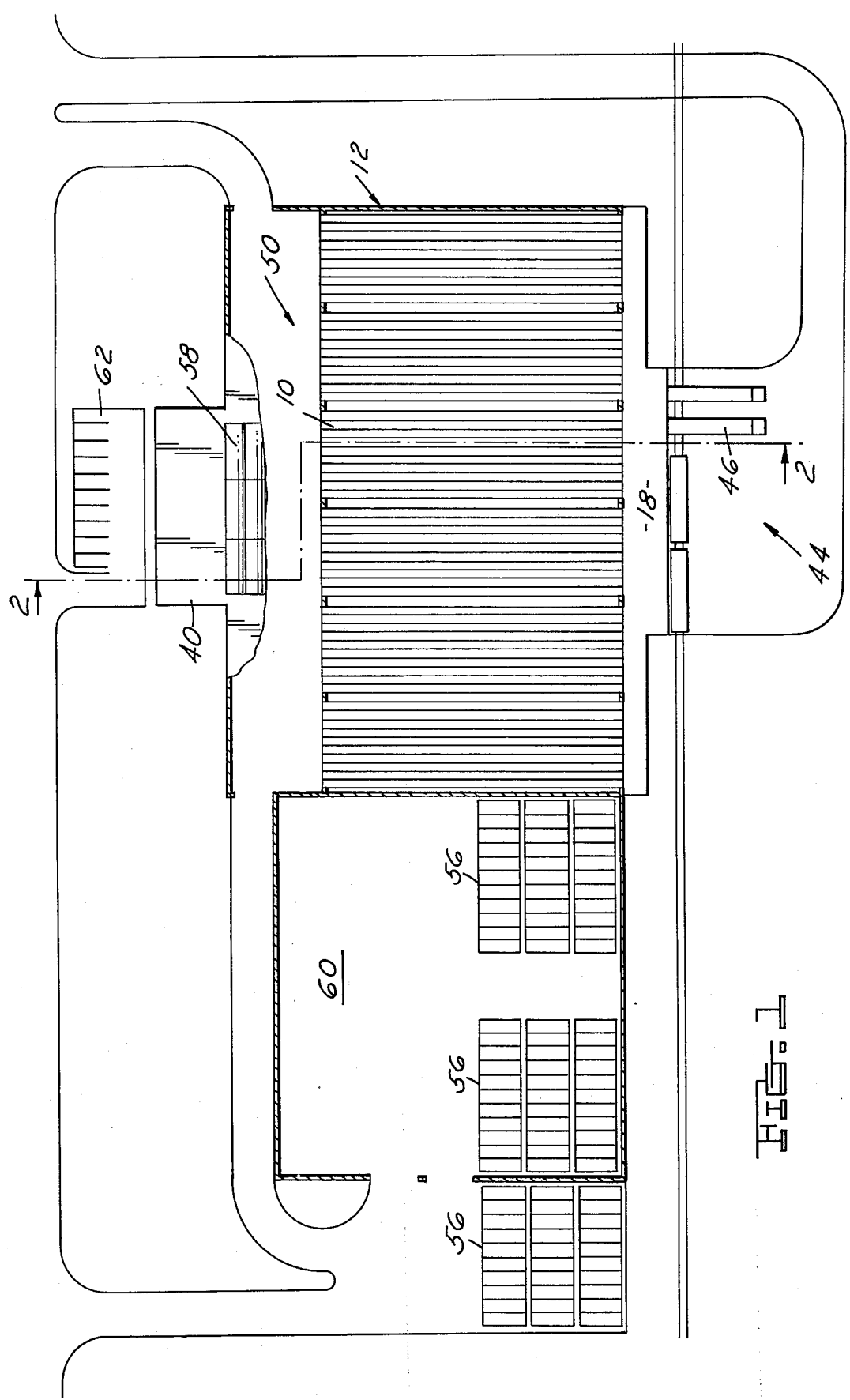

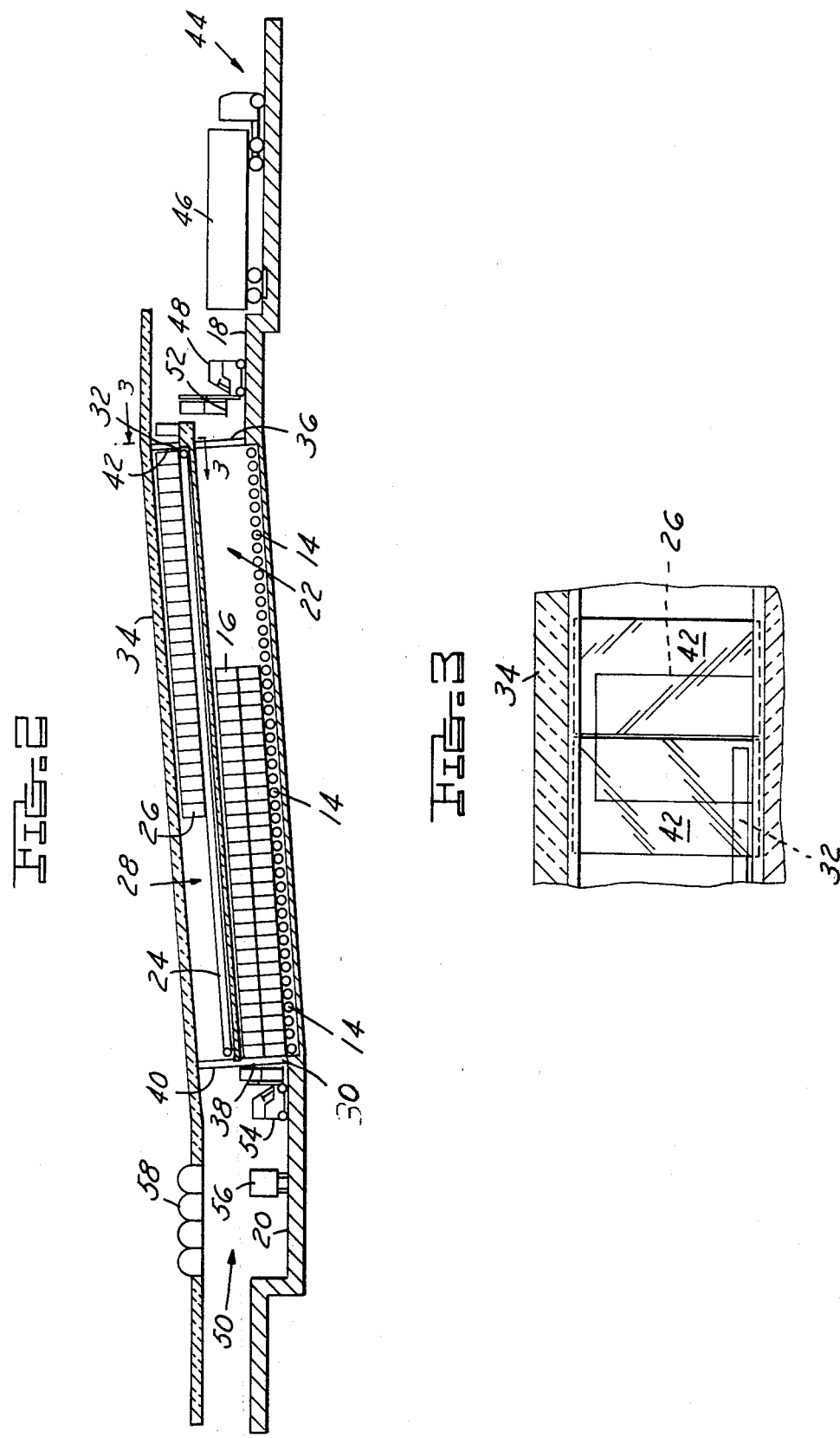

CONTROLLED ENVIRONMENT WAREHOUSING SYSTEM, APPARATUS AND PROCESS, AND METHODS OF CONSTRUCTING AND UTILIZING SAME

BACKGROUND OF THE INVENTION

The present invention relates generally to a first-in first-out controlled environment warehousing system, apparatus and process, and methods of constructing and utilizing the same.

More particularly, the present invention relates to a first-in first-out controlled environment warehousing system, apparatus and method wherein a plurality of modules provide a controlled environment in which the articles to be stored stack up substantially seriatim, and wherein such articles might be gravity-fed from one level to a lower level.

The nomenclature, terminology and phraseology "controlled environment" as used herein is intended to connote an environment wherein predetermined environmental conditions, such as temperature, humidity, pressure, type of gaseous atmosphere, light, darkness, etc., are regulated or controlled.

The nomenclature, terminology and phraseology "environmental condition" as used herein is intended to connote conditions such as temperature, humidity, pressure, type of gaseous atmosphere, light, darkness, etc.

The nomenclature, terminology and phraseology "thermal barrier" as used herein is intended to connote any means, device or barrier for separating and/or insulating the controlled environment from the ambient environment. The thermal barrier may take any one or more of a myriad of possible forms, such as rolling doors, or a wall, sheet, or blast of air having one or more of its environmental conditions controlled or regulated.

The nomenclature, terminology and phraseology "gravity-fed" and "requires only the force of gravitation for conveying" are intended to connote that the feeding and/or conveying occurs or transpires solely or primarily in response to and because of the force of gravity, and that no source of energy, such as an electrical, gas-powered, oil-powered, or coal-powered source, is required in order to achieve the desired feeding or conveying.

Heretofore, or at least up to the advent of the present invention, there has been a desideratum for a warehousing system which would provide a controlled environment for the product or articles to be stored with a minimum of maintenance and energy expended for such controlled environment. Some prior art attempts to achieve the aforesaid desideratum have fallen quite short of their target. However, when to the aforesaid deseratum there are added the additional requirements of a warehousing system which provides storage and removal on a first-in first-out basis, with a minimization of human error, and wherein only the product enters the controlled environment to the exclusion of fork lifts and other loading and unloading equipment, the prior art warehousing techniques are completely inadequate.

Moreover, recent recurring energy crises have been at least partially responsible for the warehousing industry to vociferously express a dire need for obtaining a controlled environment, first-in first-out warehousing system with minimal or reduced operational energy requirements. No completely satisfactory techniques to fulfill the aforementioned dire need have come to the fore.

Without dwelling on a plethora of animadversions concerning the prior art warehousing systems which are mentioned hereinabove, suffice it to say that none of the prior art warehousing developments provide a gravity-fed controlled environment warehousing system which virtually eliminates or minimizes human error, and provides a warehousing system with very significant operational energy savings, decreased maintenance costs, decreased taxes and insurance, and a first-in first-out storage and unloading basis for the product or articles being warehoused. In contrast, the present invention provides a novel warehousing system, apparatus and process which possesses the aforementioned advantages and desirable criteria and parameters. Optionally, the invention provides a system having: means for precluding substantially all light and/or people from a controlled environment in a first passage; a second passage for insulating the first passage from above or below; and/or one or more layers of earth or conventional building materials at least partially insulating the system.

SUMMARY OF THE INVENTION

The present invention provides a first-in, first-out controlled environment warehousing system, which comprises at least one module including first means therein for conveying articles to be stored from a first level toward a second level. The first level is disposed a predetermined distance higher than the second level. Each such module includes at least one first passage therein through which the articles may traverse when moving from the first level toward the second level. The system also includes second means for causing the articles to stack up substantially seriatim in each such first passage to enable the stacked up articles to be readily removed at the second level on a first-in first-out basis. Each such first passage is provided with a controlled environment therein to subject the articles in the first passage to at least one predetermined environmental condition.

The present invention also provides apparatus for implementing the aforedescribed system.

The present invention also provides a first-in first-out controlled environment warehousing process utilizing the aforedescribed system.

The nomenclature, terminology and phraseology "substantially seriatim" as used herein is intended to connote in its simplest form, serially, or one after another in order. However, such terminology is also intended to embrace arrangements wherein a plurality of the articles to be stored are in substantially the same transverse position relative to the path of conveyance or travel. For example, the present invention also contemplates an arrangement wherein the articles are aligned two abreast within an individual first passage in the aforementioned module.

It is an object of the present invention to provide a controlled environment warehousing system, apparatus and process wherein the articles or product is shipped on a first-in first-out basis.

A further object of the invention is to provide a gravity-fed warehousing system wherein a second passage is disposed above and substantially parallel to an associated one of the first passages for providing at least a partial roof insulation for the associated first passage to assist in maintaining the controlled environment in the associated first passage.

Yet a further object of the invention is to provide a controlled environment warehousing system wherein only the product enters the controlled environment, and wherein fork lifts and other loading and unloading equipment are excluded from the controlled environment.

An additional object of the invention is to provide a novel warehousing system, apparatus and process wherein the aforementioned first or conveying means requires only the force of gravitation for conveying the product or articles to be stored from the first level toward the second level.

A further object of the invention is to provide a controlled environment warehousing system which entails decreased maintenance costs vis-a-vis previous warehousing techniques.

Another object of the invention is to provide a controlled environment warehousing system, apparatus and process which includes fifth means for providing a thermal barrier through which the product or articles to be stored must traverse to enter the first passage substantially at the first level. Yet a further object of the invention is to provide a controlled environment warehousing system, apparatus and process which results in very substantial savings in operational energy.

An additional object of the invention is to provide a warehousing system, apparatus and process which includes sixth means for providing a thermal barrier through which the product or articles must traverse to be removed from the first passage substantially at the second level.

An additional object of the invention is to provide a controlled environment warehousing system, apparatus and process which entails a marked reduction in real estate, insurance and taxes.

A further object of the invention is to provide a controlled environment warehousing system, apparatus and process which includes seventh means for providing a thermal barrier through which containers for the product or article must traverse to enter the second passage substantially at the second level.

It is also an object of the invention to provide a controlled environment warehousing system, apparatus and process which results in a marked decrease in loading time for the product or articles stored.

A still further object of the invention is to provide a controlled environment warehousing system, apparatus and process which includes eighth means for providing a thermal barrier through which the containers for the product or article must traverse to be removed from the second passage substantially at the first level.

It is yet another object of the invention to provide a controlled environment warehousing system, apparatus and process which has the ready facility for easily expanded operation.

It is a further object of the invention to provide a gravity-fed controlled environment warehousing system, apparatus and process wherein at least the second level is located a predetermined distance below ground.

Another object of the invention is to provide a warehousing system, apparatus and process wherein earth is employed as at least part of the insulation for the controlled environment.

A further object of the invention is to provide a controlled environment warehousing system, apparatus and process which includes a plurality of the aforedescribed modules disposed substantially parallel to each other and connected together to form a unitary structure.

Other objects and advantages of the present invention will become apparent from the following description and appended claims, with reference being had to the accompanying drawings which form part of this specification and wherein like reference characters are intended to designate corresponding parts in the several views.

BRIEF DESCRIPTION OF THE DRAWINGS

FIG. 1 illustrates a top plan view of a gravity-fed controlled environment warehousing system according to a first possible embodiment of the present invention.

FIG. 2 illustrates a cross-sectional elevational view taken along the plane 2—2 depicted in FIG. 1.

FIG. 3 illustrates a side elevational view, partly in cross-section, taken along the plane 3—3 of FIG. 2.

DETAILED DESCRIPTION OF SOME PREFERRED EMBODIMENTS OF THE PRESENT INVENTION

Before explaining the present invention in detail, it is to be understood that the present invention is not to be limited or restricted in its applications or uses to the details of construction and arrangement of parts as illustrated in the accompanying drawings, because the present invention is capable of other embodiments, variations and modifications, and of being practiced or carried out in various other ways. Furthermore, it is to be understood that the nomenclature, terminology and/or phraseology employed herein is for the purpose of description and illustration only, and not for the purpose of limitation or restriction.

With reference to FIGS. 1 and 2, there is shown a gravity-fed controlled environment warehousing system according to a first embodiment of the present invention. The system includes a plurality of sloping modules 10 disposed substantially parallel to each other and connected together to form a unitary structure 12. Each module 10 includes first means, such as rollers 14, therein for conveying articles or product 16 to be stored from a first level 18 toward a second level 20. Level 18 is disposed a predetermined distance higher than level 20.

Each module 10 includes at least one first passage 22 therein through which the product 16 may traverse when moving from level 18 toward level 20. Each module 10 may include third means, such as conveyor 24, therein for conveying containers 26 for such articles or product 16 from level 20 back toward level 18. The containers 26 would be returnable containers which are empty and no longer contain the product 16. Each module 10 includes at least one second passage 28 therein positioned above the first passage 22 and having the conveyor means 24 therein through which second passage 28 the containers 26 may traverse when moving from level 20 back toward level 18.

The system also includes second means, such as stops 30, for causing the product 16 to stack up substantially seriatim in each passage 22 to enable the stacked up product 16 to be readily removable at level 20 on a first-in first-out basis. There is also provided fourth means, such as stops 32, for causing containers 26 to stack up substantially seriatim in passage 28 to enable the stacked up containers 26 to be readily removed at level 18 on a first-in first-out basis. The stops 30 and 32 may be conventional members which partially block the passages and such a conventional stop 32 is illustrated in FIG. 3. Each passage 22 is provided with a controlled environment therein to subject the product 16 in passage 22 to at least one predetermined environmental condition, such as, for example, a desired temperature.

Each passage 28 is disposed above and substantially parallel to an associated passage 22 for providing at least partial roof insulation for passage 22 to assist in maintaining the controlled environment in passage 22. One or more layers of earth or other material 34 assist in providing the insulation function.

It should be noted that in the particular preferred embodiment illustrated in FIGS. 1 and 2, the rollers 14 require only the force of gravitation for conveying the product 16 from level 18 toward level 20. Although this type of gravity-fed passage 22 is preferred, the present invention is not limited thereto but also might include power-driven belt conveyors, or some other suitable transporting means. The gravity-fed system of course requires no energy input.

The system also includes fifth means for providing a thermal barrier, such as rolling doors 36, through which the product 16 must traverse to enter passage 22 substantially at level 18. The system also includes sixth means for providing a thermal barrier, such as rolling doors 38, through which the product 16 must traverse to be removed from passage 22 substantially at level 20.

The system also includes seventh means for providing a thermal barrier, such as rolling doors 40, through which the empty returnable containers 26 must traverse to enter passage 28 substantially at level 20. The system also includes eighth means for providing a thermal barrier, such as rolling doors 42, through which containers 26 must traverse to be removed from passage 28 substantially at level 18. Each of the rolling doors 36, 38, 40 and 42 may be a pair of conventional glass doors mounted to roll laterally toward and away from each other in suitable tracks. Doors 42 are illustrated in FIG. 3. Conventional doors of this type are found in supermarkets.

It is to be understood that one or more or all of such rolling doors 36, 38, 40 and 42 might not be necessary for certain environments and applications, and this of course would depend upon the nature of the product 16 to be stored and would also depend upon the extent and nature of the environmental condition or conditions to which such product 16 is to be subjected. For example, if the product 16 is beer which should be kept at a predetermined cool temperature, then one or more of the rolling doors 36, 38, 40 and 42 might be required. On the other hand, if the product 16 can satisfactorily be stored under ambient climatic conditions, then one or more of the rolling doors 36, 38, 40 and 42 might not be required or necessary.

It should also be borne in mind that although the thermal barriers have been illustratively indicated above as being rolling doors, which could be controlled by suitable mechanical and/or electronic devices, such thermal barriers may take the form of some other thermal closure or a sheet or wall of preconditioned air.

In the aforedescribed preferred embodiment, only the level 20 has been indicated as being located a predetermined distance below ground. However, the present invention embraces other embodiments wherein one or both of levels 18 and/or 20 may be located above or below ground, although it is preferred to have level 18 disposed a predetermined distance higher than level 20.

From the description set forth hereinabove, it can be seen that the concept envisioned for a preferred embodiment of the present invention is a gravity-fed controlled environment warehousing system, apparatus and process, which would function fundamentally as follows.

Delivery of the product 16 to the site would occur on what may be termed the receiving side 44 of the facility. Such delivery of the product 16 might be primarily by boxcar or semi-tractor-trailer vehicles 46. The product 16 would be off-loaded at a top level 18, probably by fork-lift conveyance 48 and in-loaded into passage 22 through rolling doors 36.

At this point, the product 16 would enter the controlled environment in passage 22 and by means of rollers 14 would be gravity-transported down a gentle slope to the opposite side of the facility. Such opposite side of the facility might be termed the shipping side 50 of the facility. The product 16 thus transported might, if desired, still be on the original pallets 52 on which the product 16 arrived at the receiving side 44.

Upon reaching the shipping side 50 of the facility, each pallet 52 with product 16 thereon would stack up behind the previous one, and would be stored in this manner until such time as the product 16 thereon was needed. In the preferred embodiment of the invention, the shipping side 50 would be depressed into the ground by the aforementioned predetermined distance to allow the gravity-feed mechanism or rollers 14 to transfer the product 16 from the receiving side 44 to the shipping side 50. When the stacked up product 16 is needed, the rolling doors 38 at the shipping side 50 would be opened and the required pallets 52 and product 16 thereon would be removed from the environmentally-controlled atmosphere on a demand basis. The product 16 thus removed would then be loaded by fork-lift conveyance 54 if necessary on to delivery trucks 56 which would transport the product 16 from the site for distribution to its ultimate destination.

The handling of the empty returnable containers 26 would be accomplished basically in reverse to the above-described process. In other words, the delivery route trucks 56 coming back from their deliveries would bring the returnable containers 26 to the shipping side 50, where they would be off-loaded by fork-lift conveyance 54, palletized, and lifted to the level of passage 28 directly above the product storage area. The containers 26 would then be transported by conveyor 24 or any other suitable mechanical means up the slope to the receiving side 44 where the containers 26 would be stored in passage 28 until suitable transportation for their return to their original destination was available. At such time, the containers 26 would be removed from the receiving side 44 by fork-lift conveyance 48, loaded on to waiting boxcars or semi-tractor trailer vehicles 46, and removed from the warehouse site. By the special location of passage 28 and the stacked up containers 26 therein, the space occupied by such emptly returnable containers 26 is used as roof insulation for the environmentally controlled area therebelow.

It is very significant to note that in both the product and returnable container areas, that is the passages 22 and 28, the present invention achieves a first-in first-out situation whereby the first pallet 52 or product 16 delivered to the warehouse facility will automatically be the first one removed due to the stacking nature of this novel warehousing storage system.

The system, apparatus and process described hereinabove would apply to one or more of the modules 10, and the unitary structure 12 could readily be comprised of a plurality of modules 10, which may take the form of slanted composite tubes of the required structure, arranged side by side to form the storage facility, with the receiving side 44 preferably being at grade level and the shipping side 50 being depressed somewhat below grade level. The system and facility may also include administrative offices 58 which would preferably be situated at grade level on the shipping side 50 of the facility. This would permit an overview of both the loading of the product and the unloading of the empty returnable containers 26. Optionally, visual control of the receiving side 44 of the facility might be accomplished through closed-circuit TV connection to the offices 58.

From the foregoing, it can be seen that the present invention provides a storage facility with first-in first-out capability, thus minimizing human error, and wherein a maximum capacity of controlled environment storage with minimal cubic footage can be obtained. The present invention thus strives for peak efficiency in terms of space, energy, and initial costs.

In the accompanying drawings, there is illustrated a maintenance area 60, as well as parking facilities 62 for the administrative offices 58.

The invention also contemplates other embodiments wherein the energy or motion imparted to the rollers 14 is utilized, at least partially, for supplying energy to the conveyor 24, either directly or by intervening storage means. In this connection, it should be borne in mind that the kinetic energy of the product 16 with its associated pallets 52 is greater than the energy necessary to convey empty containers 26 from level 20 to level 18. The invention also contemplates various modifications which use intermediate-operated continuous conveying systems of various kinds, such as belt conveyors, steel-apron conveyors, chain conveyors, etc. The invention also contemplates equipment for coordination of the various mechanical and/or electrical components in the novel system to insure by control centers operating with automatic interlocking optical and accoustical signaling systems in conjunction with measuring and monitoring equipment. In this fashion, overall control may be assisted by remote indication of measured quantities of product 16, pallets 52, and returnable containers 26. The system is also amenable to a variety of other up-to-date aids, such as electronic data processing by computers for coordinating the warehousing operation.

For embodiments of the present invention where the product 16 is to be kept in a cooled controlled environment, it would be preferable for the level 20 to be only a short predetermined distance lower than level 18, depending of course on the outside ambient conditions. On the other hand, where it is desired to keep the stored product 16 at a somewhat elevated or ambient temperature, it may be desirable to have the level 20 a greater predetermined distance beneath level 18. One of the reasons for this alternate type of system resides in the fact that the underground temperature rises with increasing depth, on an average of about 1° C. for every 30 meters or 100 feet. It is for this reason that when considering, for example, mines, the deeper the mine, the hotter it generally is.

It will be evident to the artisan in this particular area of technology from the description set forth hereinabove that there is hereinprovided novel apparatuses and systems which satisfy virtually all of the objects of the present invention, as well as others, including many advantages which are of great practical utility and commercial importance.

Furthermore, because many alternate embodiments and modifications may be made of this inventive concept, and because many modifications and variations may be made of the particular embodiments hereinbefore described and illustrated, it is to be understood that all matter herein is to be interpreted merely as illustrative and not in a limiting or restricting sense.

I claim:

1. A first-in first-out controlled environment warehousing system comprising:
   at least one module including first means therein for conveying articles to be stored from a first level toward a second level;
   said first level being disposed a predetermined distance higher than said second level;
   each said module including at least one first passage therein through which said articles may traverse when moving from said first level toward said second level;
   second means for causing said articles to stack up substantially seriatim in each said first passage to enable said stacked up articles to be readily removed at said second level on a first-in first-out basis;
   each said first passage being provided with a controlled environment therein to subject said articles in said first passage to at least one predetermined environmental condition; and
   means for precluding people from said controlled environment within said first passage.

2. A first-in first-out controlled environment warehousing system comprising:
   at least one module including first means therein for conveying articles to be stored from a first level toward a second level;
   said first level being disposed a predetermined distance higher than said second level;
   each said module including at least one first passage therein through which said articles may traverse when moving from said first level toward said second level;
   second means for causing said articles to stack up substantially seriatim in each said first passage to enable said stacked up articles to be readily removed at said second level on a first-in first-out basis;
   each said first passage being provided with a controlled environment therein to subject said articles in said first passage to at least one predetermined environmental condition;
   each said module including third means therein for conveying containers for articles from said second level toward said first level; and
   each said module including at least one second passage therein through which said containers may traverse when moving from said second level toward said first level.

3. A system according to claim 2, including:
   fourth means for causing said containers to stack up substantially seriatim in each said second passage to enable said stacked up containers to be readily removed at said first level on a first-in first-out basis.

4. A system according to claim 2, wherein:

each said second passage is disposed above and substantially parallel to an associated one of said first passages for providing at least a partial roof insulation for said associated first passage to assist in maintaining said controlled environment in said associated first passage.

5. A system according to claim 2, wherein:

said first means requires only the force of gravitation for conveying said articles to be stored from said first level toward said second level.

6. A system according to claim 3, including:

fifth means for providing a thermal barrier through which said articles to be stored must traverse to enter said first passage substantially at said first level.

7. A system according to claim 6, including:

sixth means for providing a thermal barrier through which said articles must traverse to be removed from said first passage substantially at said second level.

8. A system according to claim 7, including: seventh means for providing a thermal barrier through which said containers must traverse to enter said second passage substantially at said second level.

9. A system according to claim 8, including:

eighth means for providing a thermal barrier through which said containers must traverse to be removed from said second passage substantially at said first level.

10. A system according to claim 2, wherein:

at least said second level is located a predetermined distance below ground.

11. A system according to claim 2, including:

a plurality of said modules disposed substantially parallel to each other and connected together to form a unitary structure.

12. A system according to claim 2, including:

power-driven conveyor means for transporting said articles through said first passage from said first level toward said second level.

13. A controlled environment warehouse apparatus comprising:

one module including first means therein for conveying articles to be stored from a first level toward a second level;

said first level being disposed a predetermined distance higher than said second level;

said module including one first passage therein through which said articles may traverse when moving from said first level toward said second level;

second means for causing said articles to stack up substantially seriatim in said first passage to enable said stacked up articles to be readily removed at said second level on a first-in first-out basis;

said first passage being provided with a controlled environment therein to subject said articles in said first passage to at least one predetermined environmental condition;

said module including third means therein for conveying containers for articles from said second level toward said first level; and said module including one second passage therein through which said containers may traverse when moving from said second level toward said first level.

14. A controlled environment warehouse apparatus according to claim 13, wherein:

said second passage is disposed above and substantially parallel to said first passage for providing at least a partial roof insulation for said first passage to assist in maintaining said controlled environment in said first passage.

15. A controlled environment warehouse apparatus according to claim 14, including:

means for precluding substantially all light from said controlled environment within said first passage.

* * * * *